United States Patent
Batten et al.

(10) Patent No.: US 7,060,179 B1
(45) Date of Patent: Jun. 13, 2006

(54) SANITATION BARRIER FOR OIL/GREASE SEPARATOR IN A KITCHEN

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 17 days.

(21) Appl. No.: 10/910,478

(22) Filed: Aug. 3, 2004

(51) Int. Cl.
*B01D 17/12* (2006.01)

(52) U.S. Cl. .................. 210/153; 210/170; 210/538; 210/541; 210/542; 52/508

(58) Field of Classification Search ............... 210/153, 210/170, 538, 540, 541, 542; 49/460; 52/506.06, 52/508
See application file for complete search history.

(56) References Cited

U.S. PATENT DOCUMENTS

| | | | | |
|---|---|---|---|---|
| 18,293 A * | 9/1857 | Naughten | ............... | 210/538 |
| 530,684 A * | 12/1894 | Gibbons | ............... | 210/538 |
| 549,967 A * | 11/1895 | Jacoby | ............... | 210/538 |
| 723,618 A * | 3/1903 | Newton | ............... | 210/538 |
| 1,199,266 A | 9/1916 | Grant | | |
| 2,767,801 A * | 10/1956 | Eads | ............... | 210/542 |
| 3,447,683 A | 6/1969 | Luce, Jr. | ............... | 210/83 |
| 4,228,006 A * | 10/1980 | Hanna | ............... | 210/170 |
| 4,332,681 A * | 6/1982 | Jambry et al. | ............... | 210/170 |
| 4,940,539 A * | 7/1990 | Weber | ............... | 210/538 |
| 4,983,284 A | 1/1991 | Batten | ............... | 210/187 |
| 5,098,564 A | 3/1992 | Miller et al. | ............... | 210/236 |
| 5,133,881 A | 7/1992 | Miller et al. | ............... | 210/776 |
| 5,178,754 A | 1/1993 | Batten et al. | ............... | 210/138 |
| 5,271,853 A | 12/1993 | Batten | ............... | 210/808 |
| 5,360,555 A | 11/1994 | Batten | ............... | 210/803 |
| 5,441,632 A * | 8/1995 | Charon | ............... | 210/170 |
| 5,492,619 A | 2/1996 | Batten | ............... | 210/86 |
| 5,505,860 A * | 4/1996 | Sager | ............... | 210/538 |
| 5,543,064 A | 8/1996 | Batten | ............... | 210/803 |
| 5,861,098 A * | 1/1999 | Morrison | ............... | 210/540 |
| 5,934,309 A | 8/1999 | Batten | ............... | 137/216 |
| 5,993,646 A * | 11/1999 | Powers | ............... | 210/540 |
| 6,019,894 A | 2/2000 | Batten | ............... | 210/175 |
| 6,261,462 B1 | 7/2001 | Batten | ............... | 210/739 |
| 6,368,501 B1 | 4/2002 | Batten | ............... | 210/181 |
| 6,413,435 B1 | 7/2002 | Kyles et al. | ............... | 210/800 |
| 6,478,552 B1 | 11/2002 | Batten et al. | ............... | 417/393 |
| 6,491,830 B1 | 12/2002 | Batten et al. | ............... | 210/803 |
| 6,517,715 B1 | 2/2003 | Batten et al. | ............... | 210/232 |
| 6,576,140 B1 | 6/2003 | Batten | ............... | 210/744 |
| 6,629,652 B1 | 10/2003 | Batten | ............... | 241/24.11 |
| 6,800,195 B1 | 10/2004 | Batten et al. | ............... | 210/138 |
| 6,849,176 B1 | 2/2005 | Batten et al. | ............... | 210/97 |

OTHER PUBLICATIONS

Epic Auto-Skim Grease and Oil Interceptors literature, pp. 1-4 data known but admitted prior art.

* cited by examiner

*Primary Examiner*—Christopher Upton
(74) *Attorney, Agent, or Firm*—MacCord Mason PLLC

(57) ABSTRACT

An apparatus for enhancing sanitation in a kitchen equipped with an oil/grease separator includes a barrier made of two vertical portions connected by a horizontal portion to bound a volume between the oil/grease separator and a kitchen wall and prevent the ingress of debris. The vertical portions have lower flanges for affixation to a floor, edge flanges for affixation to the separator and the wall, and horizontal ears at upper ends. The horizontal portion has downward edge flanges for affixation to the separator and the kitchen wall and is readily cut to a length for the oil/grease separator.

20 Claims, 4 Drawing Sheets

SANITATION BARRIER FOR OIL/GREASE SEPARATOR IN A KITCHEN

BACKGROUND OF THE INVENTION

This invention relates to improvements in installations of separators for the removal and recovery of fat, oil and/or grease (hereinafter referred to as oil/grease) found in effluent discharge of restaurants, food processing, or like facilities, or other circumstances involving mixtures of oil/grease to be recovered or removed.

Oil/grease removal or recovery systems are well known. Sewer system lines can become clogged from the oil/grease waste materials put into the sewer system from food handling facilities. This has led more and more sewer authorities to implement fats, oils and grease control programs. These programs regulate food handling facilities and the manner in which they process oil/grease. The object of many of these programs is to ensure that food handling facilities remove as much of the oil/grease as possible from the effluent flow, thereby releasing only grey water, perhaps with solids, to the sewer system. Various systems have been developed for such oil/grease removal. One supplier of such systems is Thermaco, Inc. in Asheboro, N.C., selling a product under the mark BIG DIPPER@. The oil/grease separators are supplied with effluent, usually from the kitchen sink, and perform their function of removing oil/grease from the water and direct the remaining water, called grey water, to a drain that leads to sewage facilities.

The oil/grease separator is usually mounted on the kitchen floor under or near the sink. These separators can be vessels that are 2–3 feet wide and 3–4 feet long, or various other sizes, so that traffic flow through the kitchen indicates their placement in out-of-the-way areas, again such as under a sink, and typically near a wall.

In addition to the maintenance of sewer lines, restaurants and other food processors must consider good sanitation. Kitchen cleanups usually include mopping the floors to remove spilled foods or other items. However, the floor between the oil/grease separator and the wall may be very difficult or impossible to reach by a person wielding a mop, particularly if it is under the sink. And, it may be difficult to look behind the oil/grease separator to see that the floor has, in fact, been satisfactorily cleaned. As a result, a need has arisen as to how to satisfy sanitation concerns of restaurant operators and governmental inspectors without introducing costly measures for reaching behind the oil/grease separators or otherwise cleaning the floor.

SUMMARY OF THE INVENTION

The present invention fulfills one or more of these needs in the art by providing a kitchen having a wall, an oil/grease separator in the kitchen near the wall and fitted to an effluent water source in the kitchen to remove oil/grease from the effluent water and discharge grey water to a drain, and a barrier configured to substantially complete a boundary of a volume between the oil/grease separator and the wall of the kitchen and prevent the ingress of debris to the volume.

The invention can also be considered an apparatus for enhancing sanitation in a kitchen equipped with an oil/grease separator including a barrier configured to substantially complete a boundary of a volume between the oil/grease separator and a wall of the kitchen and prevent the ingress of debris to the volume when installed between the oil/grease separator and the wall.

In one embodiment the barrier is a sheet of material folded to have two vertical portions connected by a horizontal portion when installed. The vertical portions may have horizontal lower flanges to permit affixation of the barrier to a floor of the kitchen. The horizontal portion may have a downwardly depending edge flange to permit affixation of the barrier to an oil/grease separator. Preferably, the vertical portions are wider than the horizontal portion so as to extend as flanges that permit affixation to vertical sides of the oil/grease separator. The barrier may be made of stainless steel. The barrier may be provided with a cutout for passage of a pipe.

In another embodiment the barrier is made of multiple separate portions to be joined, including two vertical portions connected by a horizontal portion when installed. The vertical portions may have horizontal lower flanges to permit affixation of the barrier to a floor of the kitchen. The horizontal portion typically has a downwardly depending edge flange to permit affixation of the barrier to the oil/grease separator. More preferably, the horizontal portion has two downwardly depending edge flanges, one to permit affixation of the barrier to the oil/grease separator and the other to permit affixation to the kitchen wall.

The vertical portions desirably each have two edge flanges, one to permit affixation of the barrier to the oil/grease separator and the other to permit affixation to the kitchen wall. The vertical portions may have horizontal ears at upper ends thereof, with the horizontal portion configured to be supported by and be affixed to the ears. Preferably, the horizontal portion is of a material that is readily cut by an installer of the apparatus in the kitchen to reduce the length of the horizontal portion to be supported by the ears, to span a length of the oil/grease separator. The horizontal portion may have score lines to facilitate its cutting by an installer.

Typically, the barrier is made of a material that adheres to and forms a seal with silicone sealants.

The invention can also be considered as a method of enhancing sanitation in a kitchen equipped with an oil/grease separator including installing an oil/grease separator on the floor of a kitchen near the wall, connecting an effluent water source to the oil/grease separator, connecting the oil/grease separator to a drain, and covering a volume between the oil/grease separator and the wall with a barrier.

Covering the volume may include assembling separate vertical and horizontal portions of the barrier. Assembling may include cutting the horizontal portion to a length so that the assembled barrier approximates the length of the oil/grease separator. It may also include affixing the horizontal portion to opposed ears on the vertical portions. Assembling may precede placing the assembled barrier between the oil/grease separator and the wall. Alternatively, assembling follows placing barrier portions between the oil/grease separator and the wall.

Covering typically includes applying a sealant between the barrier and the oil/grease separator and between the barrier and the wall.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
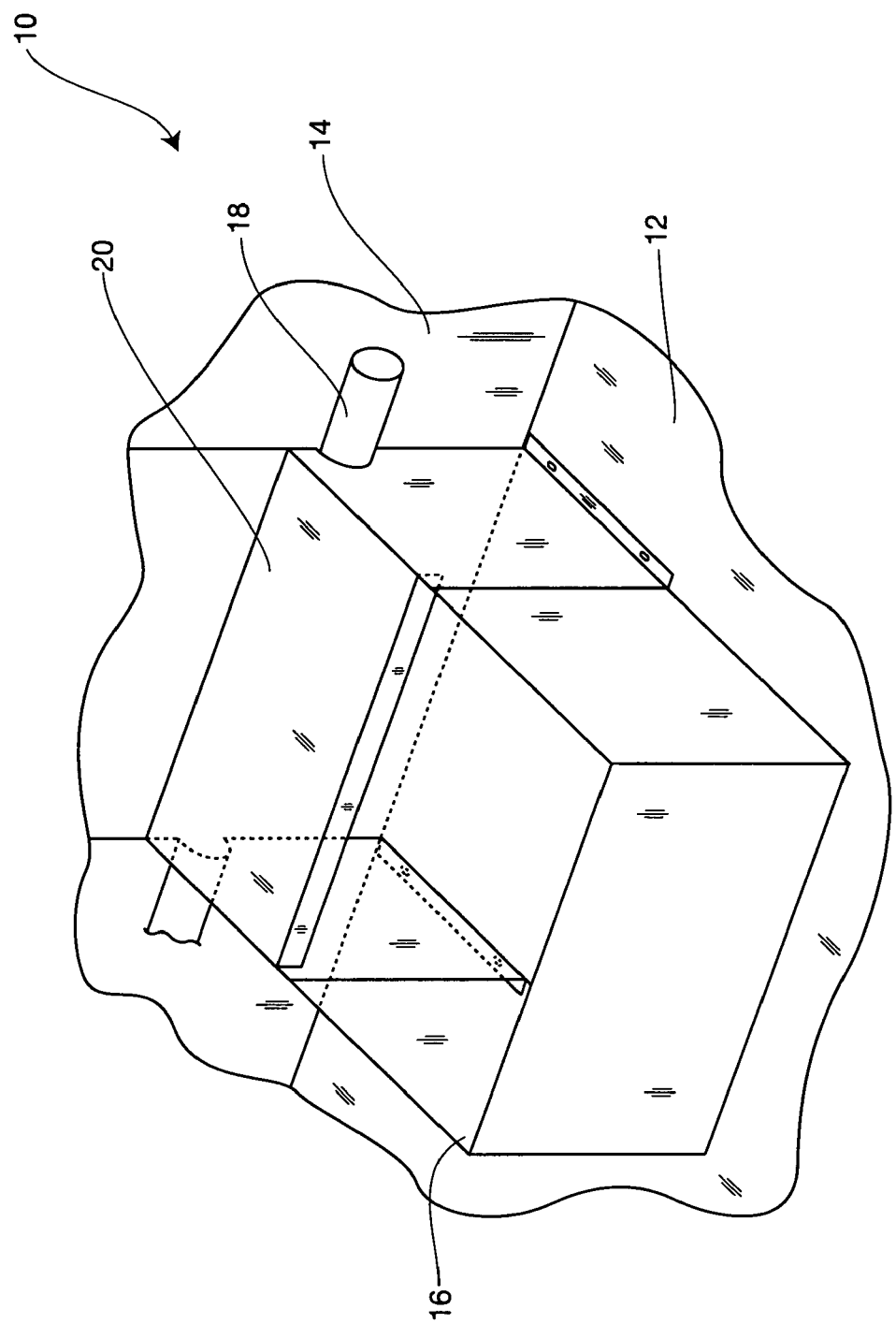
FIG. 1 is a perspective view of an oil/grease separator installed in a kitchen near a wall, with an installed barrier according to an embodiment of the invention.

As seen in FIG. 1, an installation 10 according to an example of the invention takes place having a floor 12 and a wall 14, an oil/grease separator 16 is provided spaced away from the wall 14. A suitable separator is a Big Dipper® separator sold by Thermaco, Inc. of Asheboro, N.C., particularly its 6000 Series™. It may be that a pipe 18 passes along side the wall 14. As seen, a barrier 20 is mounted that covers a volume between the oil/grease separator 16 and the wall 14, thereby preventing the ingress of debris, dirt or vermin into the space between the oil/grease separator 16 and the wall, and thereby precluding the need for additional cleaning in that hard-to-reach volume.

Figure 2:
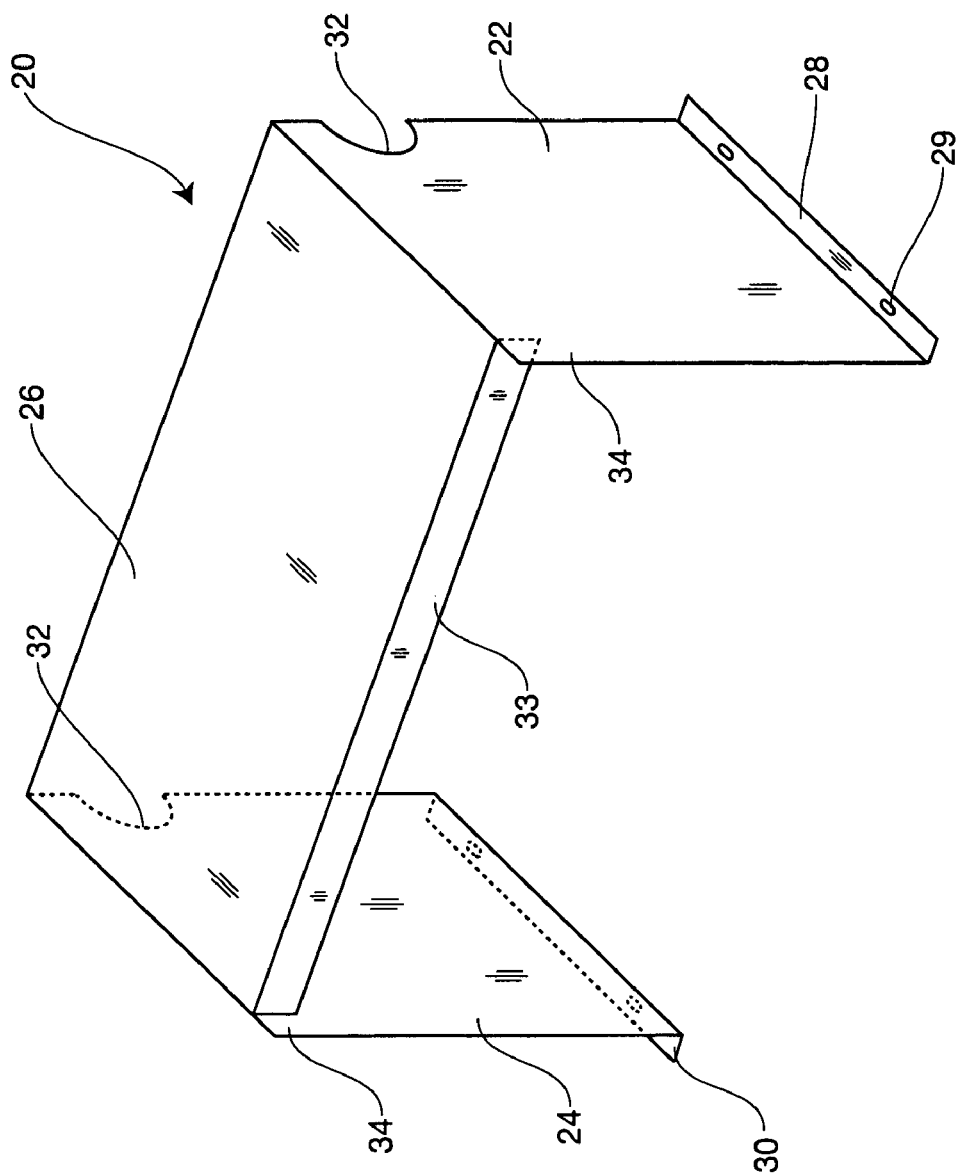
FIG. 2 is a perspective view of a barrier according to a first embodiment of the Invention.

As seen in FIG. 2, the barrier according to this embodiment is provided as a one-piece unit, preferably stainless steel, cut and bent to the shape shown in FIG. 2. The shape includes two vertical portions 22 and 24 spanned by a horizontal portion 26. Preferably these portions are sized comparable to the height and length of the oil/grease separator, so as to form a relatively continuous profile from the separator 16 to the wall 14 when installed. The vertical portions are provided with flanges 28 and 30 that, advantageously, may be provided with holes 29 to receive screws so that the flanges can be screwed into the floor.

The vertical portions 22 and 24 are provided somewhat wider than the horizontal portion 26, resulting in the formation of flanges 34 which can be used to wrap around the oil/grease separator as seen in FIG. 1. The horizontal portion 26 is provided with a depending vertical flange 32 to abut against the oil/grease separator. The barrier 20 may also be provided with cut-outs 32 to accommodate a pipe such as pipe 18 as seen in FIG. 1 passing along the wall. Also, other shapes can be cut into the barrier to accommodate items such as baseboards or other kitchen features that need to be accommodated in the installation. In the installation of the apparatus that is shown in FIG. 2, preferably a silicone sealant is provided between the flanges 32, 34 and the separator 16 to seal to the oil/grease separator and prevent the ingress of debris. Similarly, the edges of the vertical and horizontal portions that abut the wall can be sealed with silicone sealant.

Figure 3:
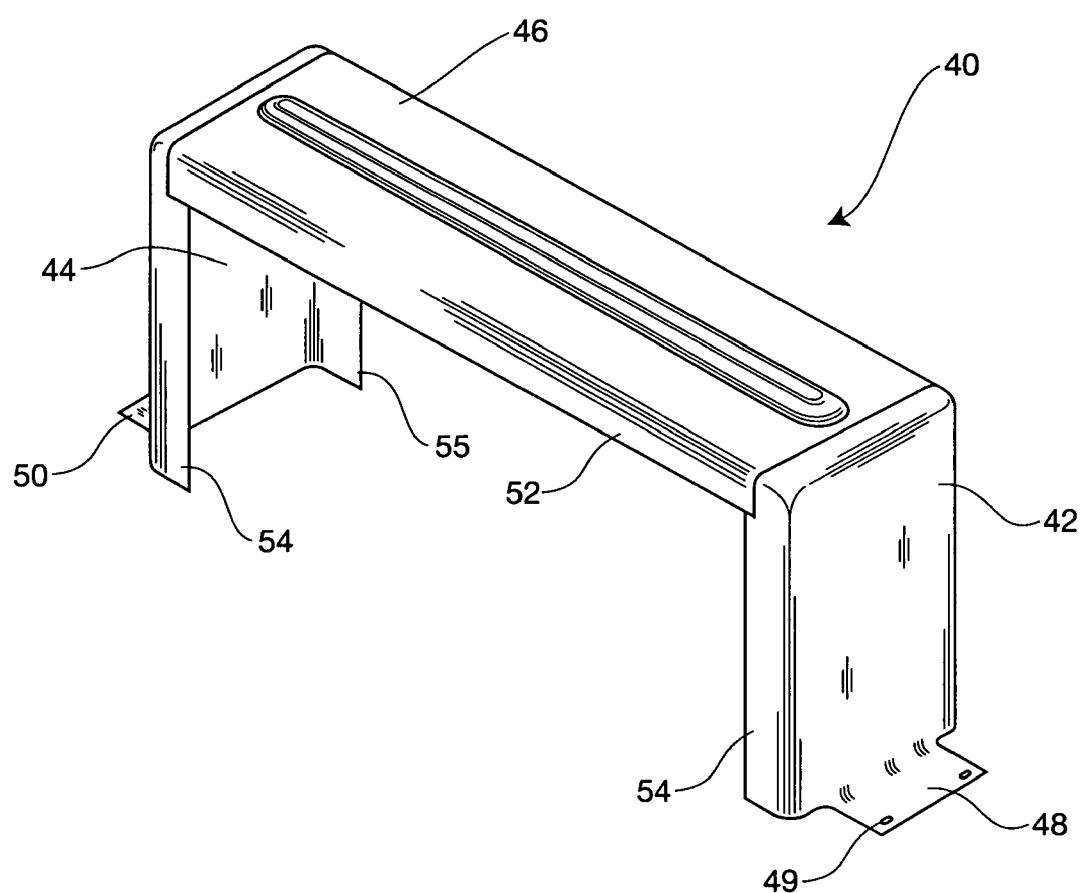
FIG. 3 is a perspective view of a barrier according to a second embodiment of the Invention.
Figure 4:
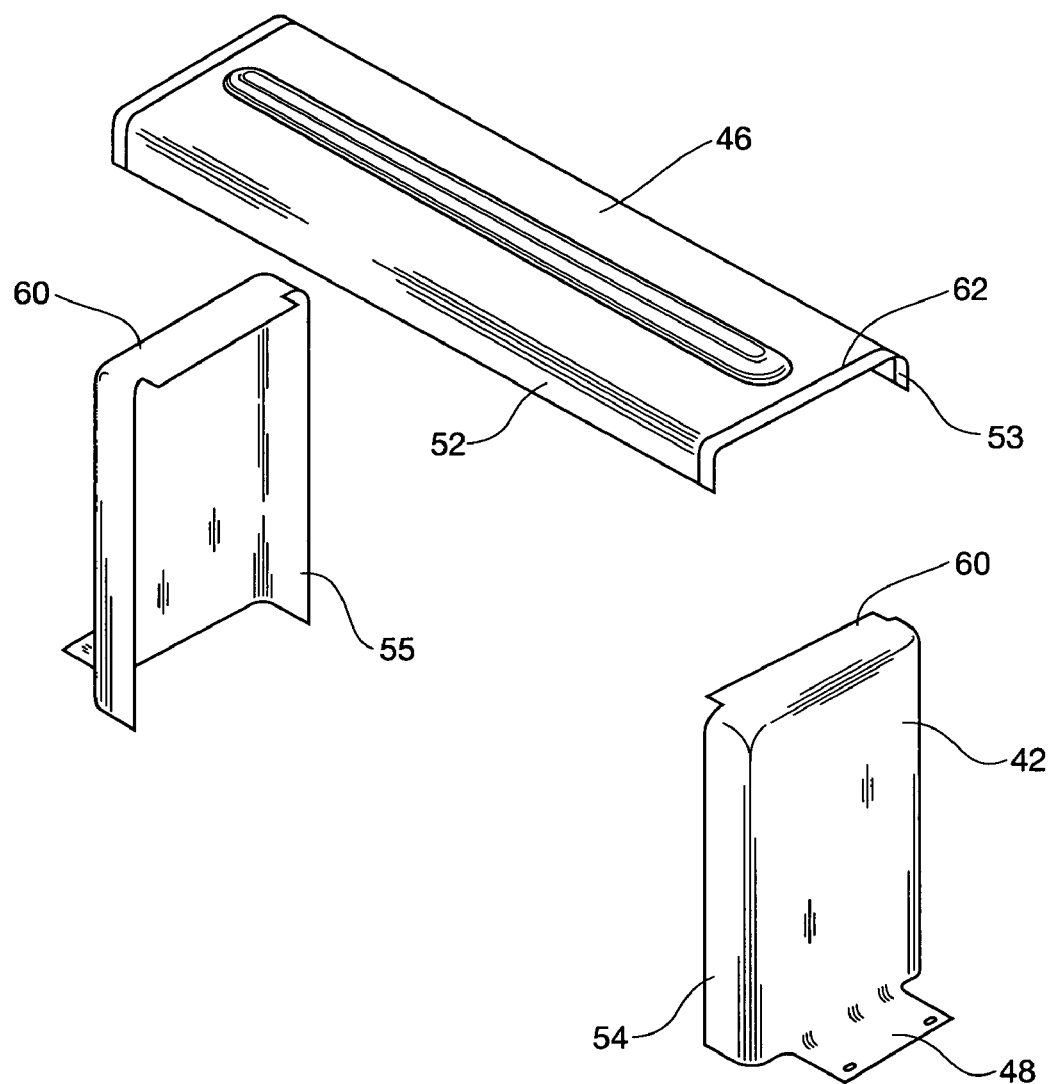
FIG. 4 is a perspective view of the second embodiment unassembled.

Another embodiment of the barrier is seen in FIGS. 3 and 4. FIG. 3 shows the vertical portions 42 and 44 assembled together with the horizontal portion 46. FIG. 4 shows the portions prior to assembly. The vertical portion 42 has a forward flange 54 and a symmetrically positioned rear flange 55 (not shown). The vertical portion 44 has similar forward 54 and rear flanges 55. The portion 42 has a lower flange 48 to permit affixation to the floor, and a similar flange 50 on vertical portion 44 performs the same purpose.

The horizontal portion 46 is provided with a forward flange 52 and a symmetrically positioned rear flange 53. It also has one or more optional score lines 62 at positions corresponding to one of several lengths of oil/grease separators which might be marketed. This permits a single elongated horizontal portion 46 to be sold and cut-down as needed for installation with the respective size of the oil/grease separator. Also, if the horizontal portion 46 is made of the appropriate material, it may be cut without a score line. Such a material may be a molded plastic.

As assembled, the flanges 54 and 52 abut the oil/grease separator and the flanges 53 and 55 may abut the wall. In the assembled apparatus, the horizontal portion 46 rests on the ears 60 of the vertical portion. The vertical portion flanges 48 may be provided with holes 49, as before, and similar holes may be used to join the ears 60 and horizontal portion 46. Again, the assembled apparatus may be sealed with a silicone sealant against the oil/grease separator and also against the wall.

The apparatus of FIGS. 3 and 4 may be assembled prior to locating the combined assembly between the oil/grease separator and the wall. Alternatively, they may be assembled as they are put in place between the oil/grease separator and the wall.

Once assembled, the barrier prevents the ingress of debris to the volume between the oil/grease separator and the wall, thereby eliminating the need to be concerned about mopping or otherwise reaching into that volume.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. In a kitchen equipped with an oil/grease separator, the improvement comprising an apparatus for enhancing sanitation comprising
    a barrier configured to substantially complete a boundary of a volume between the oil/grease separator and a wall of the kitchen and prevent the ingress of debris to the volume when installed between the oil/grease separator and the wall.

2. An apparatus as claimed in claim 1 wherein the barrier is a single sheet of material folded to have two vertical portions connected by a horizontal portion when installed.

3. An apparatus as claimed in claim 2 wherein the vertical portions have horizontal lower flanges to permit affixation of the barrier to a floor of the kitchen.

4. An apparatus as claimed in claim 2 wherein the horizontal portion has a downwardly depending edge flange to permit affixation of the barrier to an oil/grease separator.

5. An apparatus as claimed in claim 4 wherein the vertical portions are wider than the horizontal portion so as to extend as flanges that permit affixation to vertical sides of the oil/grease separator.

6. An apparatus as claimed in claim 5 wherein the barrier is made of stainless steel.

7. All apparatus as claimed in claim 1 wherein the barrier has a cutout for passage of a pipe.

8. An apparatus as claimed in claim 1 wherein the barrier is made of multiple separate portions to be joined, including two vertical portions connected by a horizontal portion when installed.

9. An apparatus as claimed in claim 8 wherein the vertical portions have horizontal lower flanges to permit affixation of the barrier to a floor of the kitchen.

10. An apparatus as claimed in claim 8 wherein the horizontal portion has a downwardly depending edge flange to permit affixation of the barrier to the oil/grease separator.

11. An apparatus as claimed in claim 8 wherein the horizontal portion has two vertical, downwardly depending edge flanges, one to permit affixation of the barrier to the oil/grease separator and the other to permit affixation to the kitchen wall.

12. An apparatus as claimed in claim 8 wherein the vertical portions each have two edge flanges, one to permit affixation of the barrier to the oil/grease separator and the other to permit affixation to the kitchen wall.

13. An apparatus as claimed in claim 8 wherein the vertical portions have horizontal ears at upper ends thereof and the horizontal portion is configured to be supported by and be affixed to the ears.

14. An apparatus as claimed in claim 13 wherein the horizontal portion is of a material that is readily cut by an installer of the apparatus in the kitchen to reduce the length of the horizontal portion to be supported by the ears, to span a length of the oil/grease separator.

15. An apparatus as claimed in claim 13 wherein the horizontal portion has score lines to facilitate its cutting by an installer of the apparatus in the kitchen to reduce the length of the horizontal portion to be supported by the ears, to span a length of the oil/grease separator.

16. An apparatus as claimed by claim 8 wherein the barrier is made of a material that adheres to and forms a seal with silicone sealants.

17. An apparatus for enhancing sanitation as claimed in claim 1 further comprising a sealant for application between the barrier and the ol/grease separator.

18. An apparatus for enhancing sanitation as claimed in claim 1 wherein said oil ease separator is
    in the kitchen near the wall and fitted to an effluent water source in the kitchen to remove oil/grease from the effluent water and discharge grey water to a drain.

19. In a kitchen equipped with an oil/grease separator, the improvement comprising an apparatus for enhancing sanitation comprising
    a barrier of a single sheet of stainless steel folded to have two vertical portions connected by a horizontal portion to substantially complete a boundary of a volume between the oil/grease separator and a wall of the kitchen and prevent the ingress of debris to the volume when installed between the oil/grease separator and the wall,
    wherein the vertical portions have horizontal lower flanges to permit affixation of the barrier to a floor of the kitchen, the horizontal portion has a downwardly depending edge flange to permit affixation of the barrier to the oil/grease separator, and the vertical portions are wider than the horizontal portion so as to extend as flanges to permit affixation to vertical sides of the oil/grease separator.

20. In a kitchen equipped with an oil/grease separator, the improvement comprising an apparatus for enhancing sanitation comprising
    a barrier made of multiple pieces of a material that adheres to and forms a seal with silicone sealants, including two vertical portions connected by a horizontal portion when installed, to substantially complete a boundary of a volume between the oil/grease separator and a wall of the kitchen and prevent the ingress of debris to the volume when installed between the oil/grease separator and the wall,
    wherein the vertical portions have horizontal lower flanges to permit affixation of the barrier to a floor of the kitchen, the horizontal portion has two downwardly depending edge flanges, one to permit affixation of the barrier to the oil/grease separator and the other to permit affixation to the kitchen wall, the vertical portions each have two edge flanges, one to permit affixation of the barrier to a the oil/grease separator and the other to permit affixation to the kitchen wall, the vertical portions have horizontal ears at upper ends thereof and the horizontal portion is configured to be supported by and be affixed to the ears, and the horizontal portion is of a material that is readily cut by an installer of the apparatus in the kitchen to reduce the length of the horizontal portion to be supported by the ears, to span a length of the oil/grease separator.

\* \* \* \* \*